United States Patent [19]

Lippi et al.

[11] Patent Number: 5,055,640
[45] Date of Patent: Oct. 8, 1991

[54] MULTI-PIN VACUUM SWITCH ARRANGEMENT

[75] Inventors: Bruno Lippi, Aarau; Ernst Suter, Kolliken; Hans-Rudolf Wüthrich, Oberentfelden; Thomas Meier, Niedergösgen, all of Switzerland

[73] Assignee: Sprecher Energie AG, Oberentfelden, Switzerland

[21] Appl. No.: 493,834

[22] Filed: Mar. 9, 1990

[30] Foreign Application Priority Data

Mar. 16, 1989 [CH] Switzerland ............ 00984/89

[51] Int. Cl.⁵ .......................................... H01H 33/66
[52] U.S. Cl. .................................................. 200/144 B
[58] Field of Search ............... 200/144 B, 148 F, 400, 200/293

[56] References Cited

U.S. PATENT DOCUMENTS 4,449,021 5/1984 Wakayama et al. ............ 200/144 B
4,479,042 10/1984 Basnett ............................ 200/144 B
4,587,390 5/1986 Gray ................................... 200/400
4,973,803 11/1990 Fujiwara et al. ............... 200/144 B
4,996,397 2/1991 Kuhn ............................... 200/144 B

FOREIGN PATENT DOCUMENTS 0060054 9/1982 European Pat. Off. .

Primary Examiner—J. R. Scott
Attorney, Agent, or Firm—Fleit, Jacobson, Cohn, Price, Holman & Stern

[57] ABSTRACT

An insulating supporting frame of a multi-pin switch arrangement has a box-shaped base part and an insulating supporting part arranged over it. Insulating housings encompassing the vacuum switch tubes are formed onto a wall part. On the rear, bearing parts which are parallel to one another and at a distance from one another are cast onto the wall part, the bearing parts being connected to a top wall of the box-shaped base part. A drive shaft of a spring-force drive is mounted on the bearing parts. The spring-force drive is connected via a linkage to a movable switch contact of the vacuum switch tube. The one-piece insulating supporting frame is constructed in such a way that practically all the parts of the switch arrangement can be arranged on it.

10 Claims, 4 Drawing Sheets

MULTI-PIN VACUUM SWITCH ARRANGEMENT

FIELD OF THE INVENTION

The present invention relates to a multi-pole switch arrangement and an insulating supporting frame for such a multi-pole switch arrangement.

BACKGROUND OF THE INVENTION

EP-PS 0 060 054 discloses a multi-pole vacuum switch arrangement with a mobile rack. A one-piece insulating supporting part is secured backwards onto this rack, said insulating supporting part having three recesses arranged next to one another and open to the front, in which in each case one vacuum switch tube is secured. A housing is also secured on the rack, in which housing a drive, for example a spring-force drive, is arranged which is connected via linkages to the movable switch contacts of the vacuum switch tubes. Towards the bottom there are projecting extensions formed onto the insulating supporting part which form bearing points for double-armed levers of the linkages. Although this insulating supporting part assumes a plurality of functions, the construction of the entire switch arrangement is still costly.

U.S. Pat. No. 4,587,390 discloses a further switch arrangement. This has a housing containing a spring-force drive, on which housing three tubular insulating frames are arranged in an upright manner. In each insulating supporting frame, a vacuum switch tube is secured, the contacts of which are connected in each case to one connecting conductor which penetrates the respective insulating supporting frame in a radial direction. In the housing of the spring-force drive, two parallel shields laterally spaced from one another are provided, on which the drive parts of the spring-force drive are mounted. Each movable contact of the vacuum switch tubes is operatively connected via, in each case, one linkage to the drive member, which is common to all the poles, of the spring-force drive. This switch arrangement has many individual parts and its construction and installation are costly.

In the Swiss Patent Application No. 2283/88-0, which is not a prior publication, corresponding to U.S. Pat. application Ser. No. 07/361,257 now U.S. Pat. No. 5,015,809 a multi-pole vacuum switch arrangement is described which has a single insulating supporting part which receives the vacuum switch tubes of all the poles and on which a bearing part or a plurality of bearing parts to bear parts of the spring-force drive is provided. This insulating supporting part is secured on a plate-shaped, mobile, metal rack.

SUMMARY OF THE INVENTION

The object of the present invention is to provide an arrangement and an insulating supporting frame which are simple in design, have few parts and can be manufactured with little outlay.

A one-piece insulating supporting frame is provided which is formed by the insulating supporting part, at least one bearing part to bear parts of the spring-force drive and by the rack. The insulating supporting frame is thus not only an insulating supporting element for the vacuum switch tubes but also a permanent component of the drive and of the rack. The drive, the insulating supporting part and the rack thus form a functional unit which can no longer be divided up. Such an insulating supporting frame can be manufactured by injection molding, casting, foam formation or similar processes.

In a preferred embodiment the insulating supporting frame has an essentially hollow box-shaped base part, on which the insulating supporting part is arranged. This base part gives the insulating supporting frame good stability and if required provides space for the spring-force drive, or for the linkages connecting the spring-force drive to the movable switch contacts of the vacuum switch tubes. This permits very compact construction of the switch arrangement.

A particularly preferred embodiment permits simple manufacture of the insulating supporting frame.

With double-walled construction of the wall part, particularly good stability and insulation properties of the wall part are achieved. A free access between the wall part walls permits easy securing and installation on the wall part of, for example, voltage-conducting parts, the insulation of the wall part being retained.

In a preferred embodiment the spring-force drive is arranged on the side, facing away from the insulating housings, of the wall part. Such an arrangement provides easy access to the spring-force drive even if the switch arrangement is in operation.

In a further preferred embodiment, the spring-force drive is provided in the base part of the insulating supporting frame. This permits a particularly narrow embodiment of the switch arrangement and a particularly simple design of the linkages between the spring-force drive and the vacuum switch tubes.

BRIEF DESCRIPTION OF THE DRAWINGS

The invention is now described in greater detail with reference to the embodiments represented in the figures, wherein, represented in purely diagrammatic form.

DETAILED DESCRIPTION OF THE PREFERRED EMBODIMENT

Figure 1:
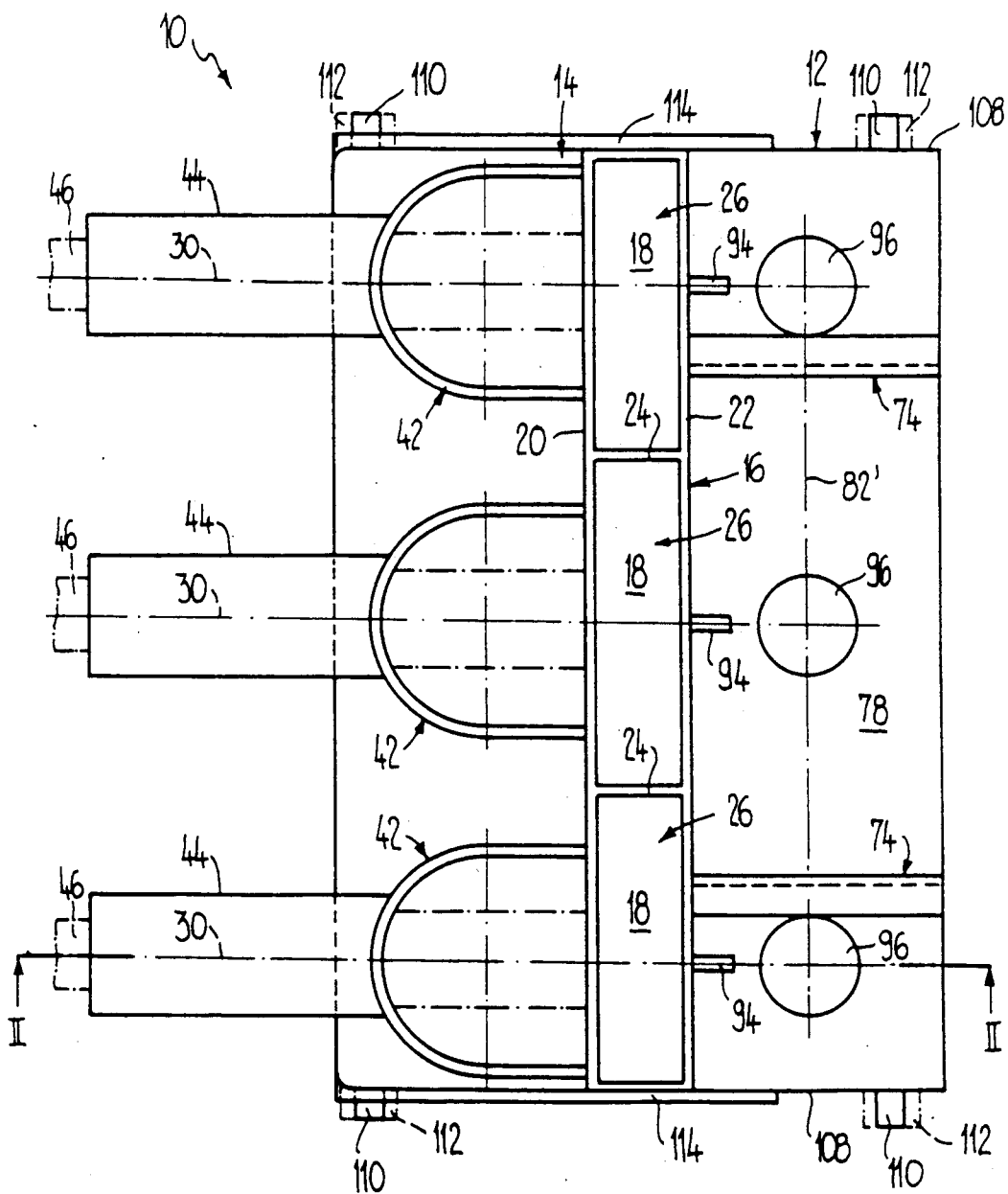
FIG. 1 shows a top view of an insulating supporting frame.
Figure 2:
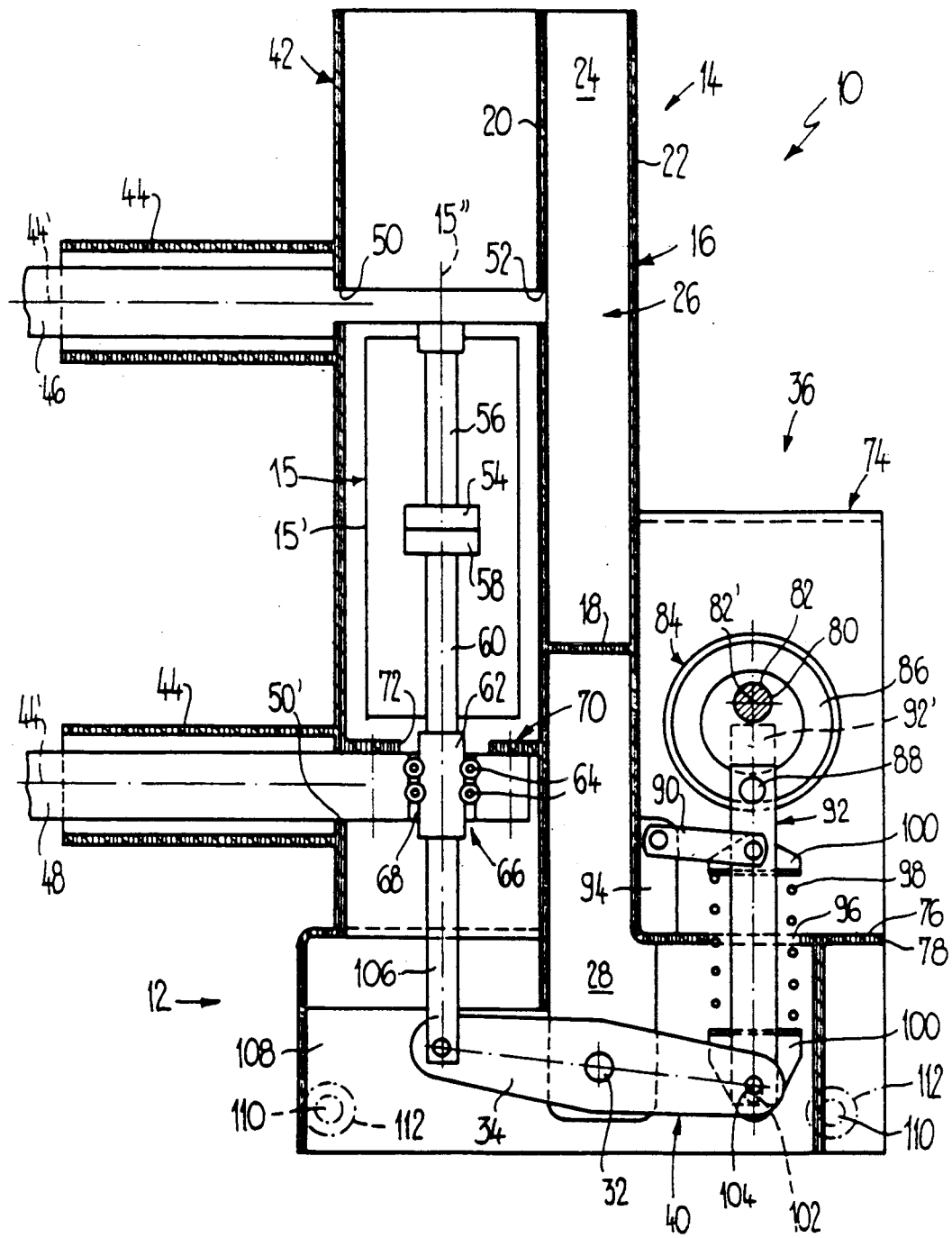
FIG. 2 shows a vertical section along the line II—II of FIG. 1 through the insulating supporting frame with vacuum switch tubes arranged on the latter and with a spring-force drive.
Figure 3:
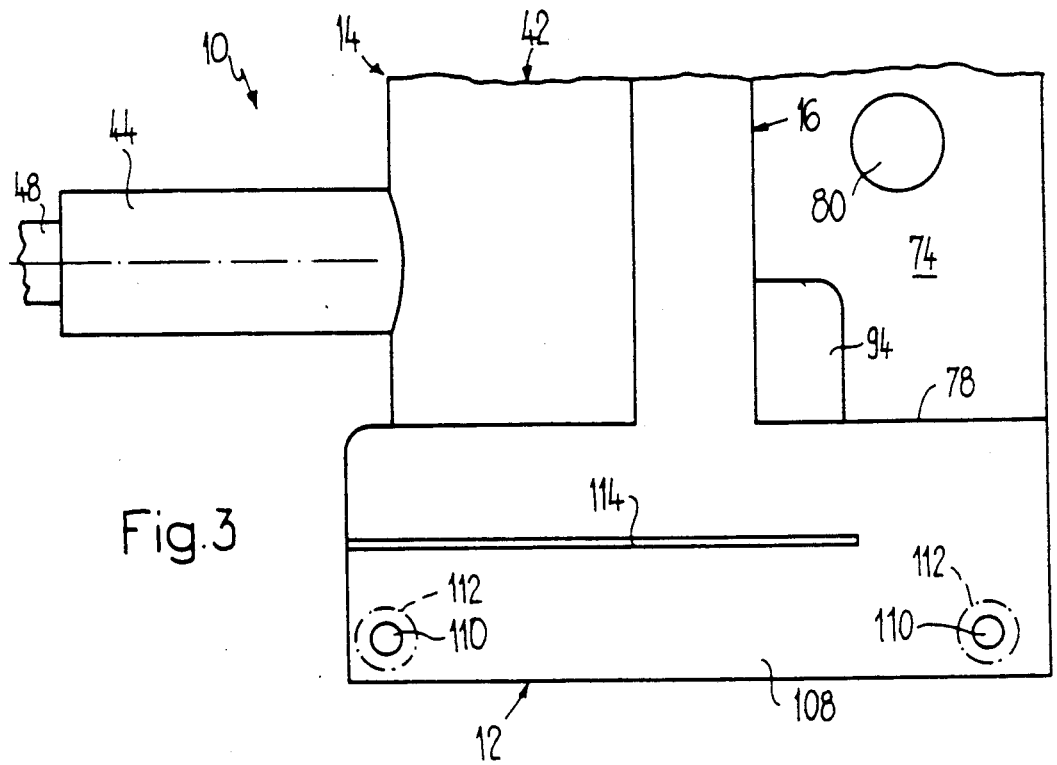
FIG. 3 shows a side view of the lower part of the insulating supporting frame.

FIGS. 1 to 3 show an insulating supporting frame, designated by 10, of a three-pole switch arrangement. This insulating supporting frame 10 has a hollow box-shaped base part 12 which is open towards the bottom, on which an insulating supporting part 14 for the three vacuum switch tubes 15 is formed. The insulating supporting part 14 has an upright wall part 16 which extends approximately along a central plane of the base part 12.

The wall part 16 is constructed to be double-walled and has, viewed from above, the cross-section of a rectangular hollow section. Halfway up the wall part 16 a horizontal intermediate floor 18 is provided which connects the two wall parts 20, 22 to one another (see in particular FIG. 2). Above the intermediate floor 18 there are two vertical webs 24 provided which connect the two wall parts 20, 22 to one another, said webs insulating in relation to one another the hollow spaces 26 which are assigned to the individual poles of the switch arrangement, limited by the wall parts 20, 22 and the webs 24 and are open towards the top (FIG. 1). Below the intermediate floor 18 there are further webs 28 arranged between the two wall parts 20, 22, said webs extending in the region of vertical planes 30 indicated by dot-dash lines in FIG. 1, which planes form the central plane of each pole of the switch arrangement. These further webs 28 extend towards the bottom beyond the wall part 16 and project as a tongue shape into the base part 12. In these projecting regions, the further webs 28 have bearing points 32 for the respective bearing of double-armed levers 34 by linkages 40 which connect a spring-force drive 36 to the vacuum switch tubes 15.

On the front of the wall part 16, represented on the left of the wall part in the figures, insulating housings 42 are formed on the wall part 20 which are U-shaped in cross-section, are symmetrical along the central plane 30 of each pole and completely surround, together with sections of the wall part 20, the vacuum switch tubes 15. The insulating housings 42 are open towards the base part 12 towards the top and the bottom.

On each insulating housing 42 there are two insulating tubes 44 formed which are at a distance from one another in a vertical direction, are tube-shaped, extend in a horizontal direction and project forwards, the longitudinal axes 44' of which insulating tubes extend in the relevant central planes 30. Each insulating tube 44 encompasses an upper or lower connecting conductor 46, 48 which is in each case coaxial with the central plane 30 (compare in particular FIG. 2). The upper connecting conductors 46 are in each case led through a corresponding recess 50 in the insulating housing 42 and through a passage 52 lying diametrically opposite the recess 50 in the wall part 20. The upper connecting conductors 46 can thus be secured to the insulating supporting frame 10 by means of securing elements (not represented) which are arranged in the hollow spaces 26. Such a connecting conductor 46, the installation and securing of the connecting conductor 46 and of the vacuum switch tubes 15 are described in detail in Swiss Patent Application No. 00 294/89-1, corresponding to U.S. Pat. application Ser. No. 07/465,749.

The vacuum switch tube 15 has a fixed switch contact 54 which is secured to the inner end of a switch pin 56 which leads through the housing 15' of the vacuum switch tube 15 and is secured to the housing. At its upper end, the switch pin 56 and thus the vacuum switch tube 15 is secured to the upper connecting conductor 46. The axis of the vacuum switch tube 15 extends in a vertical direction and is designated by 15". A movable switch contact 58 of the vacuum switch tube 15 is secured to the upper end of a switch tappet 60 which passes tightly through the housing 15', the switch tappet having at its lower end a thickened part 62, along which rollers 64 of a roller contact arrangement 66 move.

The thickened part 62 of the switch tappet 60 penetrates a recess 68, extending in the direction of the axis 15" of the is led through a corresponding recess 50' in the insulating housing 42. An intermediate floor 70 is formed on the insulating housing 42 and on the wall part 20, said intermediate floor having a passage 72 for the switch tappet 60 and onto which intermediate floor the lower connecting conductor 48 is screwed tight. The rollers 64 also move along the recess 68 of the lower connecting part 48. The roller contact arrangement 66 and the securing and design of the lower connecting conductor 48 are described in greater detail in Swiss Patent Application No. 00 295/89-3, corresponding to U.S. Pat. application Ser. No. 07/482,919, now U.S. Pat. No. 4,996,397.

At the rear of the wall part 16, two bearing parts 74 which are parallel to one another, at a distance from one another, extend vertically and project at right angles from the wall part 16 and are formed on the wall part 22. These bearing parts 74 are constructed to be wall-shaped and their lower ends 76 open into the top wall 78 of the base part 12. Each bearing part 74 has a bearing passage 80, on which a drive shaft 82 of the spring-force drive 36 is rotatably mounted (see FIGS. 2 and 3). The axis 82' of the drive shaft 82 extends in a horizontal direction and parallel to the wall part 16 (also see FIG. 1). Such a spring-force drive is described in detail in Swiss Patent Application No. 00 800/89-1, corresponding to U.S. Pat. application Ser. No. 07/482,919 now U.S. Pat. No. 4,996,397.

On the drive shaft 82, two parallel disks 84 are mounted non-rotatably at a distance from one another, of which only one is represented in FIG. 2. The disks 84 have pairs of mirror-inverted grooves 86 running approximately eccentrically around the drive shaft 82, in which grooves a bolt-shaped reciprocating member 88 is restrictedly guided. The reciprocating member 88 is arranged at the upper end of a link 92 mounted in a swivelable manner on a rocking arm 90 and on the double-armed lever 34. The rocking arm 90 is mounted in a swivelable manner at its end region remote from the link 92 to a bearing shield 94 formed on the wall part 22 and on the top wall 78. In the region of the links 92, there are passages 96 hollowed out in the top wall 78. In the region between the rocking arm 90 and the double-armed lever 34, the link 92 is surrounded by a contact compression spring 98, which is supported via in each case one support disk 100 at the upper end on the link 92 and at the lower end on the double-armed lever 34. The link 92 has an elongate hole 102 in its lower end region, through which hole a pin 104 extends which is connected both to the lower support disk 100 and to the double-armed lever 34.

The double-armed lever 34 is operatively connected at its end region lying opposite the pin 104 via an insulating rod 106 to the thickened part 62 of the switch tappet 60.

In the rotation position, represented in FIG. 2, of the drive shaft 82 of the spring-force drive 36, the switch arrangement is switched on, the two switch contacts 54, 58 of each vacuum switch tube 15 resting on one another and being pressed against one another by means of the tensioned contact compression spring 98. In order to switch off the switch, the drive shaft 82 is rotated, in the example shown through approximately 180°, by means of a spring arrangement (not represented), the link 92 of each pole being pulled as a result of the restricted guidance of the reciprocating member 88 in the grooves 86 of the disks 84 into an upper end position 92' represented by broken lines. In this position the two switch contacts 54, 58 are lifted away from one another and the contact compression spring 98 is released as far as is permitted by the elongate hole 102 in the link 92. To switch on the switch the drive shaft 82 is in turn swiveled in the same direction of rotation, in the example shown through approximately 180 , by means of the spring arrangement which is not represented, whereby the switch contacts 54, 58 come to rest on one another and the contact compression spring 98 is again tensioned. It is also possible to use different angles of rotation of the drive shaft 82 for switching on and off, by means of corresponding shaping of the grooves 86 in the disks 84, the total of the angles of rotation for switching on and off being in each case 360°.

Spigot-shaped bearing members 110 which project outwards are formed on the side walls 108 of the base part 12, on which members travel rollers 112, indicated by dots and dashes, are mounted. These travel rollers 112 can for example be guided in the rails, which are not represented, of a switch cabinet. If the travel rollers 112 are guided in rails on the floor, it is then also possible for the bearing members 110 to project from the side walls 108 towards the inside of the base part 12.

Also, connecting members 114 are formed onto the base part 12 which project from the side walls 108 and extend in the travel direction of the switch arrangement, see FIGS. 1 and 3. On moving the switch arrangement, locking devices or shutters for bulkhead walls in a switch cabinet can be actuated by means of these connecting members 114.

Figure 4:
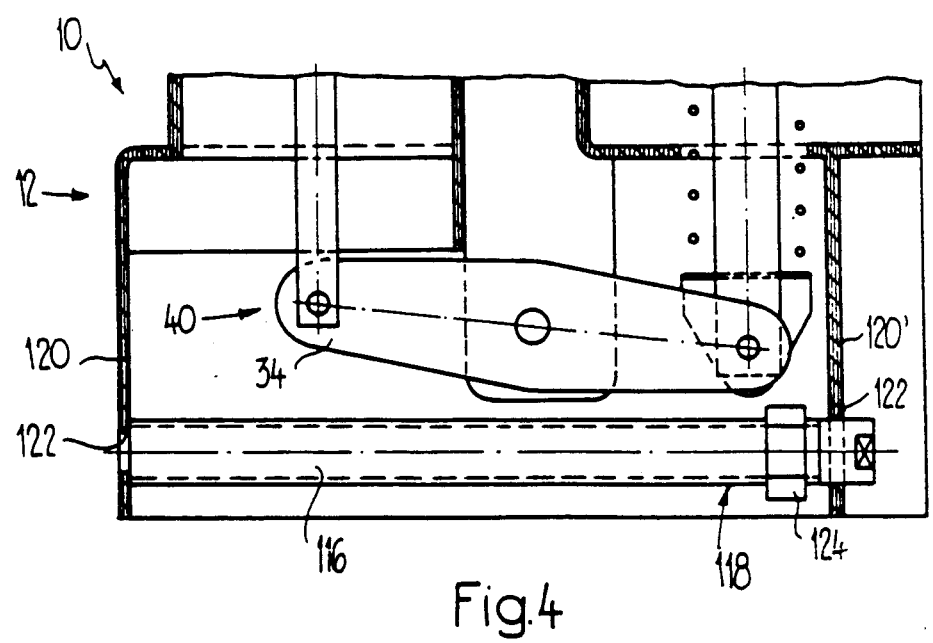
FIG. 4 shows a section along the line II—II of FIG. 1 of the further embodiment of the base part of the insulating supporting frame.

FIG. 4 shows a section according to FIG. 2 through the base part 12 of an insulating supporting frame 10 which is essentially of the same design as the insulating supporting frame 10 shown in FIGS. 1 to 3. Below the double-armed lever 34 of the linkage 40 there is a spindle 116, extending in the direction of movement of the switch arrangement, of a screw gearing 118, which is mounted, in a fixed and rotatable manner in relation to the insulating supporting frame 10, on passage-shaped bearing elements 122 which are formed on the front and rear wall 120, 120' of the base part 12. On the spindle 116 there is a running nut 124 which is held in a nonrotatable and fixed manner on the cabinet which is not represented. By turning the spindle 116 by hand or by means of an electric motor, the switch arrangement can be transferred from an on setting, in which the contact conductors 46, 48 are engaged with fixed counter contacts, into a separated setting, in which the connecting conductors 46, 48 are separated from the corresponding fixed counter contacts and vice versa.

Figure 5:
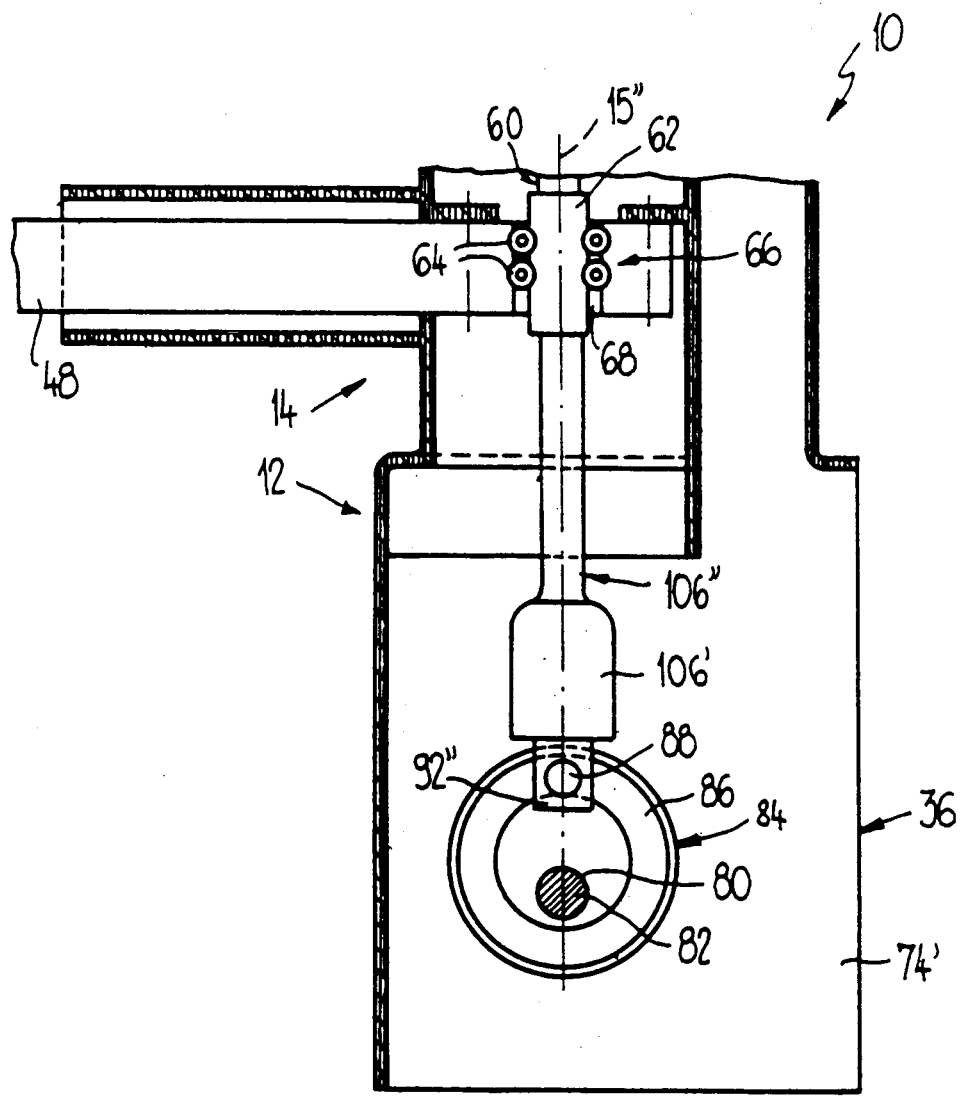
FIG. 5 shows a vertical section through a lower part of an insulating supporting frame, on which the spring-force drive is mounted in the base part.

In the exemplary embodiment represented in FIG. 5, the spring-force drive 36 is arranged in the base part 12 of the insulating supporting frame 10. The bearing parts 74' which correspond to the bearing parts 74 according to FIGS. 1 to 3, are provided inside the base part 12. In the region of the insulating supporting part 14 the insulating supporting frame 10 is of identical design as that represented in FIGS. 1 to 3. The insulating supporting part 14 is therefore not described in any more detail. The base part 12 represented in FIG. 5 is also box-shaped in construction and open towards the bottom and the rear. The drive shaft 82 crosses the axes 15" of the vacuum switch tubes 15 at a right angle (compare FIG. 2) and is rotatably mounted in corresponding passages 80 in the bearing parts 74'. On the drive shaft 82 there are also two disks 84 per pole mounted rotatably having grooves 86 in which the bolt-shaped reciprocating members 88 are guided. Each reciprocating member 88 is coupled to a link 92" which is operatively connected to a generally known contact compression spring arrangement arranged inside a bell-shaped extension 106' of an insulating bar 106", said contact pressure spring arrangement not being represented. The insulating bar 106" extends in the direction of the axis 15" of the vacuum switch tube 15 and is connected at its upper end to the thickened part 62 of the switch tappet 60. This thickened part 62 leads through the recess 68 in the lower connecting conductor 48. The rollers 64 of the roller contact arrangement 66 move along the recess 68 of the connecting conductor 48 and along the thickened part 62. The method of operation of the spring-force drive 36 and of the contact compression spring arrangement is exactly the same as in the exemplary embodiment presented above and is therefore not described any further. Of course, additional guide members can be provided for the insulating bar 106". This embodiment is particularly space-saving and moreover, the drive power can be transmitted with low loss to the vacuum switch tubes, without any deflections via linkages being necessary.

It is of course also conceivable that the base part 12 has a floor and is closed off towards the bottom. However, in this respect, in an exemplary embodiment according to FIGS. 1 to 3, corresponding recesses must be provided on walls of the base part 12 in order to introduce the necessary parts of the linkage 40 into the base part 12 and to mount them there. In this exemplary embodiment, the contact tappet 60 could be directly linked to an insulating double-armed lever 34.

Not only can the drive shaft 82 be mounted on the bearing parts 74, 74', these bearing parts 74, 74' and, if required, walls of the base part 12 and of the wall part 16 can be constructed in such a way that other and preferably all the parts of the spring-force drive 36 can be mounted and arranged on them.

The one-piece insulating supporting frame is constructed in such a way that practically all the parts of the entire switch arrangement can be secured to it.

We claim:

1. A multi-pole vacuum switch arrangement, in particular for medium-high voltage, said multi-pole vacuum switch arrangement comprising:
   a box-shaped base part,
   an insulating supporting part arranged on the box-shaped base part, the insulating supporting part being substantially hollow and open downwardly towards the box-shaped base part,
   vacuum switch tubes of the switch arrangement at least partially enclosed by said insulating support part,
   a spring-force drive arranged on the box-shaped base part, said spring-force drive including drive means having a spring force for opening and closing movable contacts of the vacuum switch tubes, said drive means being connected via linkages to the movable contacts of the vacuum switch tubes,
   at least one bearing part for mounting of the spring force drive,
   the insulating supporting part, the at least one bearing part for mounting parts of the spring-force drive and the box-shaped base part forming a one-piece insulating supporting frame and at least said drive means being mounted on the at least one bearing part of the insulating supporting frame,
   said insulating supporting part having a substantially flat, upright wall part at least partially enclosing with insulating housings, formed on one side of said substantially flat, upright wall part, the vacuum switch tubes.

2. A switch arrangement as claimed in claim 1, wherein the wall part is double-walled, having stiffening webs connecting two wall parts to one another.

3. A switch arrangement as claimed in claim 1, wherein the at least one bearing part is formed in a projecting manner on the wall part on the side facing away from the insulating housings.

4. A switch arrangement as claimed in claim 3, wherein a part of the box-shaped base part on the side, facing away from the insulating housings, of the wall part projects beyond the wall part, and the at least one bearing part is connected to the box-shaped base part and bearing points for mounting linkage parts provided in the box-shaped base part.

5. A switch arrangement as claimed in claim 3, wherein two bearing parts are provided, extending substantially at right angles to the wall part, parallel to one another and at a distance from one another.

6. A switch arrangement as claimed in claim 1, wherein the at least one bearing part is provided inside the box-shaped base part.

7. A switch arrangement as claimed in claim 1, wherein bearing members for travel rollers are formed on the insulating supporting frame, on the box-shaped base part.

8. A switch arrangement as claimed in claim 1, wherein connecting members for actuating locking devices are formed on the insulating supporting frame, on the box-shaped base part.

9. A switch arrangement as claimed in claim 1, wherein bearing elements for parts of a drive arrangement for moving the switch arrangement are formed onto the boxed-shaped base part.

10. A switch arrangement as claimed in claim 9, wherein the drive arrangement has a screw gearing, a spindle of which, running in the direction of movement of the switch arrangement, is mounted on the box-shaped base part to be fixed and rotatable in relation to the insulating supporting frame.

* * * * *